(12) United States Patent
Kiyose et al.

(10) Patent No.: US 6,242,838 B1
(45) Date of Patent: Jun. 5, 2001

(54) COMMUTATOR AND METHOD OF MANUFACTURING THE SAME

(75) Inventors: Kenzo Kiyose, Takahama; Yoshio Ebihara; Keiichi Yamashita, both of Kariya; Mutsumi Yoshino, Nagoya; Yoshitsugu Sakamoto, Kariya; Motoya Ito, Hekinan, all of (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 09/241,291

(22) Filed: Feb. 1, 1999

(30) Foreign Application Priority Data

| Feb. 2, 1998 | (JP) | 10-021107 |
| Mar. 30, 1998 | (JP) | 10-083781 |
| Mar. 30, 1998 | (JP) | 10-083782 |
| Nov. 5, 1998 | (JP) | 10-314583 |
| Nov. 5, 1998 | (JP) | 10-314688 |

(51) Int. Cl.$^7$ .................................................. H02K 13/06
(52) U.S. Cl. ........................ 310/233; 310/235; 310/237
(58) Field of Search .................................. 310/231, 233, 310/235, 236, 237; 29/596, 597, 598

(56) References Cited

U.S. PATENT DOCUMENTS

| 5,175,463 | * | 12/1992 | Farago et al. | 310/237 |
| 5,400,496 | * | 3/1995 | Kemmner et al. | 29/597 |
| 5,629,576 | * | 5/1997 | Shimoyama | 310/237 |
| 5,637,944 | * | 6/1997 | Shimoyama | 310/237 |
| 5,793,140 | * | 8/1998 | Tuckey | 310/237 |

* cited by examiner

Primary Examiner—Tran Nguyen
(74) Attorney, Agent, or Firm—Nixon & Vanderhye P.C.

(57) ABSTRACT

A commutator is composed of a contact unit, a base member made of insulation material and a terminal unit. The contact unit has a flat brush-contact surface and a connection surface opposite the brush contact surface. The contact unit also has a plurality of commutator segments. The terminal unit has a plurality of conductive terminal members. The base member supports the commutator segments. The commutator also has an electrical connection structure having a set of a convex member and a concave member and a plurality of connection members disposed between the convex member and the concave member to connect the plurality of the commutator segments and terminal members respectively.

11 Claims, 13 Drawing Sheets

COMMUTATOR AND METHOD OF MANUFACTURING THE SAME

CROSS REFERENCE TO RELATED APPLICATION

The present application is based on and claims priority from Japanese Patent Applications Hei 10-21107 filed on Feb. 2, 1998, Hei 10-83781 filed on Mar. 30, 1998, Hei 10-83782 filed on Mar. 30, 1998, Hei 10-314583 filed on Nov. 5, 1998, and Hei 10-314688 filed on Nov. 5, 1998, the contents of which are incorporated herein by reference.

BACKGROUND OF THE INVENTION

1. Field of the Invention

The present invention relates to a commutator composed of carbon segments, particularly a commutator of a fuel injection pump motor, and to a method of manufacturing the above commutator.

2. Description of the Related Art

A commutator composed of a plurality of carbon segments is disclosed in U.S. Pat. No. 5,175,463. The carbon segments of the shaped commutator are insulated from one another by grooves. The commutator has a plurality of terminal members disposed in parallel with the rear surface of the carbon segments to be connected to the carbon segments by brazing filler metal or solder. The surfaces of the carbon segments to be connected to the terminal members are plated with metal to ensure the connection.

However, when the terminal members are connected to leads extending from armature windings by fusing or the like, fusing heat is conducted through comparatively short heat passages of the terminal members to the brazing filler. This heat may melt the brazing filler to short-circuit the carbon segments.

SUMMARY OF THE INVENTION

A main object of the invention is to provide an improved commutator segment which is free from short-circuiting of the commutator segments when it is assembled into a motor.

Another object of the invention is to provide a commutator that has comparatively long heat passages from lead-connecting portions of terminal members to portions thereof soldered to contact members of commutator segments.

Another object of the invention is to provide an improved electric motor which can be used in corrosive circumstances such as used in fuel.

Another object of the invention is to provide a method of manufacturing such commutator segments easily at low production cost.

A main feature of the invention is a commutator that includes a contact unit having a flat brush-contact surface and a connection surface, a base member made of insulation material and a terminal unit. The contact unit has a plurality of commutator segments, and the terminal unit has a plurality of conductive terminal members. The base member supports the commutator segments and insulates the same from one another. The commutator also has an electrical connection structure having a set of a convex member and a concave member and a plurality of connection members disposed between the convex member and concave member.

Preferably, the convex member has a plurality of projections axially extending from the contact unit, and the concave member has a portion of the terminal unit engaged with the projections. The contact unit and the terminal unit are spaced apart from each other except the connection structure.

An insulation spacer can be disposed between the contact unit and the terminal unit. This structure can simplify molding process of the base member. The electrical connection structure can include a rise member disposed between the contact unit and the terminal unit to hold the connection member when the connection members are melted.

Another main feature of the invention is a method of manufacturing a commutator that includes a contact unit having a flat brush-contact surface and a connection surface, a base member made of insulation material and a terminal unit.

The method is composed of the steps of forming a solid carbon disk having a plurality of axially extending arc-shaped projections, plating the peripheral surfaces of the arc-shaped projections with conductive metal, forming a brass ring member having a plurality of through holes, assembling the solid carbon and the brass ring so that the arc-shaped projections are disposed into the through holes respectively to have appropriate molding spaces between the solid carbon disk and the brass ring, inserting solid solders in connection spaces defined the through holes and the inside surface of the arc-shaped projections, heating the solders to melt in the connection spaces, filling resinous insulation material in the molding spaces, and cutting the solid carbon disk and the ring member to provide the plurality of commutator segment and the plurality of terminal members.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

A commutator according to a first embodiment of the invention is described with reference to FIGS. 1–3. The commutator that is denoted by reference numeral 50 is used in fuel pump 10 as shown in FIG. 3. Fuel pump 10 is composed of pump section 20 and dc motor section 30. Motor section 30 has annular permanent magnets on the inner periphery of cylindrical housing 11 and armature rotor 32 inside the permanent magnets. Pump section 20 has aluminum casing 21, aluminum casing cover 22 and impeller 23. Casing cover 22 is clamped to an end of casing 21. Armature rotor 32 has shaft 35, which is supported by radial bearing 25 and thrust bearing 26 at one end thereof, and by radial bearing 27 at the other. Casing cover 22 has fuel inlet 40, from which fuel is pumped into C-shaped pump passage 41 formed around impeller 23. Fuel in pump passage 41 is supplied to fuel chamber 31 by impeller 23 of motor section 30. Armature rotor 32 has armature core 32a on which an armature winding is wound. Disk-like commutator 50 is fixed to an upper portion of armature rotor 32 to supply electric power to the armature winding. When the armature winding is energized by a battery through terminal 46, armature rotor 32 rotate to rotates to impeller 23, so that fuel is pumped from fuel inlet 40 into fuel passage 41 to be supplied to fuel chamber 31. Then, the fuel passes around armature rotor 32 and goes out from fuel inlet 43. Fuel outlet 43 has check valve 44 to prevent fuel from returning.

Figure 2:
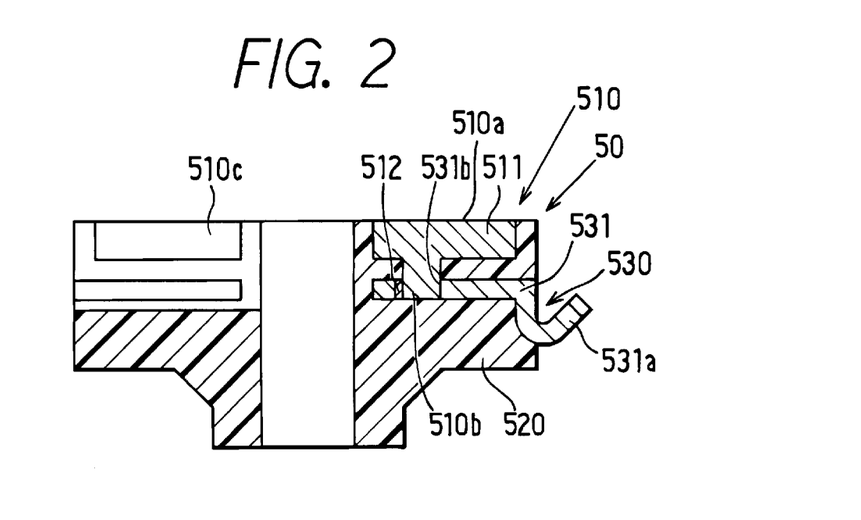
FIG. 2 is a cross-sectional side view of the commutator cut along line 1—1 in FIG. 1.
Figure 3:
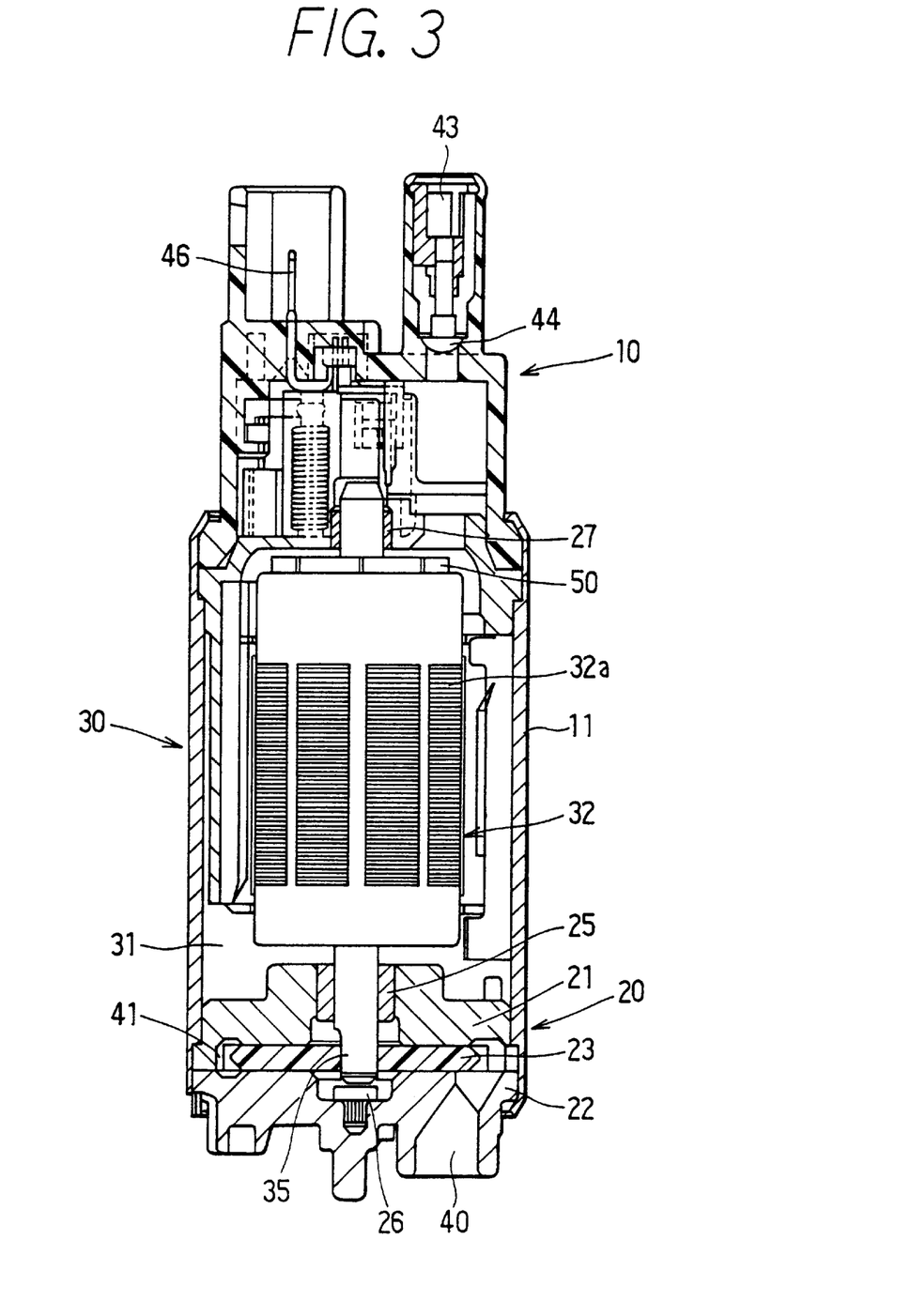
FIG. 3 is a cross-sectional side view illustrating a fuel pump equipped with the commutator according to the first embodiment.

As shown in FIG. 2, commutator 50 is composed of contact unit 510, base member 520 made of thermoplastic resin, and terminal unit 530. Contact unit 510 has flat brush-contact surface 510a on one end thereof and axially extending eight arc-shaped projections or convex portions 510b on the other end.

Figure 1:
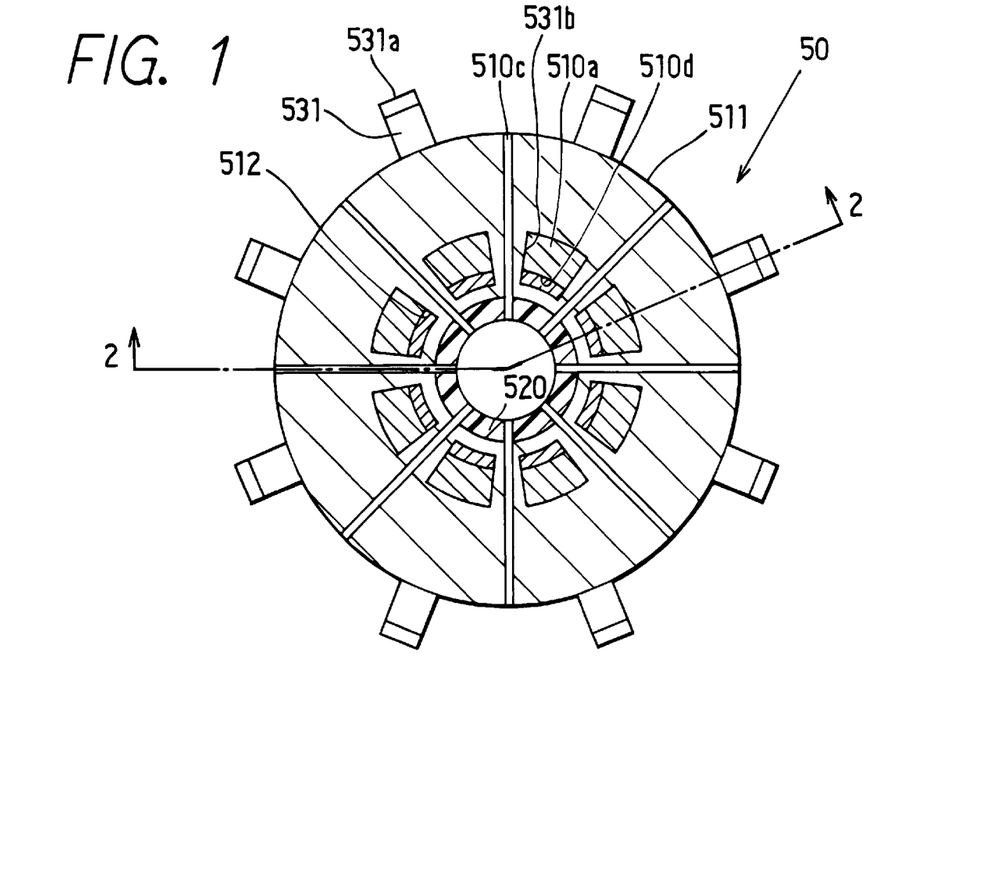
FIG. 1 is a cross-sectional plan view of the commutator according to a first embodiment of the invention.

As shown in FIG. 1, contact unit 510 is composed of eight arc-shaped carbon segments 511 supported by resinous base member 520 to be circumferentially spaced apart from one another by insulation grooves.

Terminal unit 530 is composed of eight brass-made terminal members 531 supported by base member 520 to be circumferentially spaced apart from one another by radially extending insulation groove 510c. Each of terminal members 531 has hook 531a and rectangular through hole or concave portion 531b with which one of arc-shaped projections 510b is in contact. A lead extending from the armature winding is to be connected to each of hooks 531a by fusing or the like. Rectangular through holes 531b also provide connection spaces inside arc-shaped projections 510b. Connection members or blazing filler members 512 made of solder are filled in the connection spaces respectively to electrically connect each of segments 511 to corresponding one of terminal members 531.

Commutator 50 is manufactured as follows.

(1) A solid carbon disk having eight axially extending arc-shaped projections is formed, and the peripheral surfaces of the arc-shaped projections are plated with a conductive metal.

(2) A brass ring member is formed to have eight rectangular through holes 531b.

(3) The solid carbon and the brass ring are assembled so that the arc-shaped projections are inserted into the rectangular through holes respectively and held by a tool to have appropriate molding spaces between the solid carbon disk and the brass ring.

(4) Solid solders are inserted in connection spaces defined by the rectangular through hole and the inside surface of the arc-shaped projection and heated to melt therein, thereby forming connection members 512.

(5) The holding tool is removed, and resinous insulation material is filled in the molding spaces to form base member 520 and, in turn, an uncut commutator.

(6) Eight longitudinal grooves 510c are formed to divide the carbon disk and the ring into eight segments 511 and eight terminal members 531. Thus, commutator 50 is provided.

Leads of armature winding are connected to hooks 531a by a fusing device with the main electrode thereof being put on the radially outer portion of hook and another electrode being put on a portion of terminal member 531 remote from the main electrode. Insulation coating of the leads are melted by Joule heat before the leads are welded to hooks 531a.

Although Joule heat is conducted to connection member 512 from hooks 531a, the heat is dissipated due to a comparatively long conduction passage so that connection members 512 can be kept solid. Even if a portion of connection members 512 is melted accidentally, melted solder is prevented by base member 520 from reaching any one of grooves 510c. Thus, segments 511 are prevented from short-circuiting.

Figure 4:
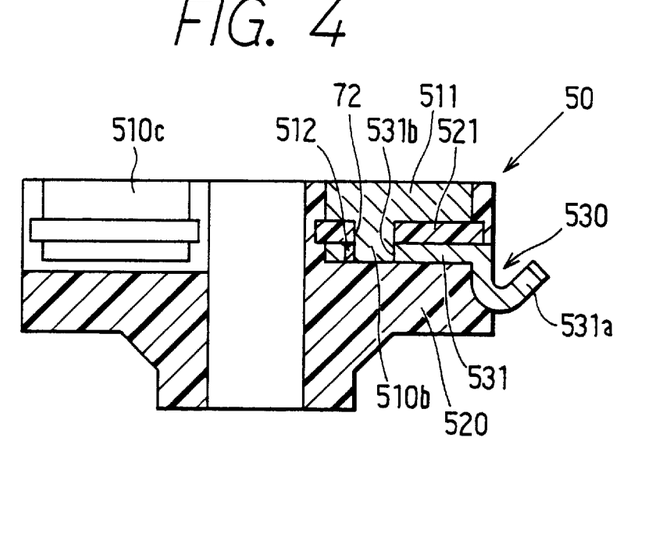
FIG. 4 is a cross-sectional side view illustrating a variation of the commutator according to the first embodiment of the invention.

As a variation of commutator 50 according to the first embodiment of the invention, an insulation spacer 521 having eight rectangular through holes which correspond to through holes 531b can be inserted as shown in FIG. 4 before base member is formed. This structure can dispense with the tool for setting appropriate molding spaces and to reduce pressure to fill the insulation material into the molding spaces.

Figure 5:
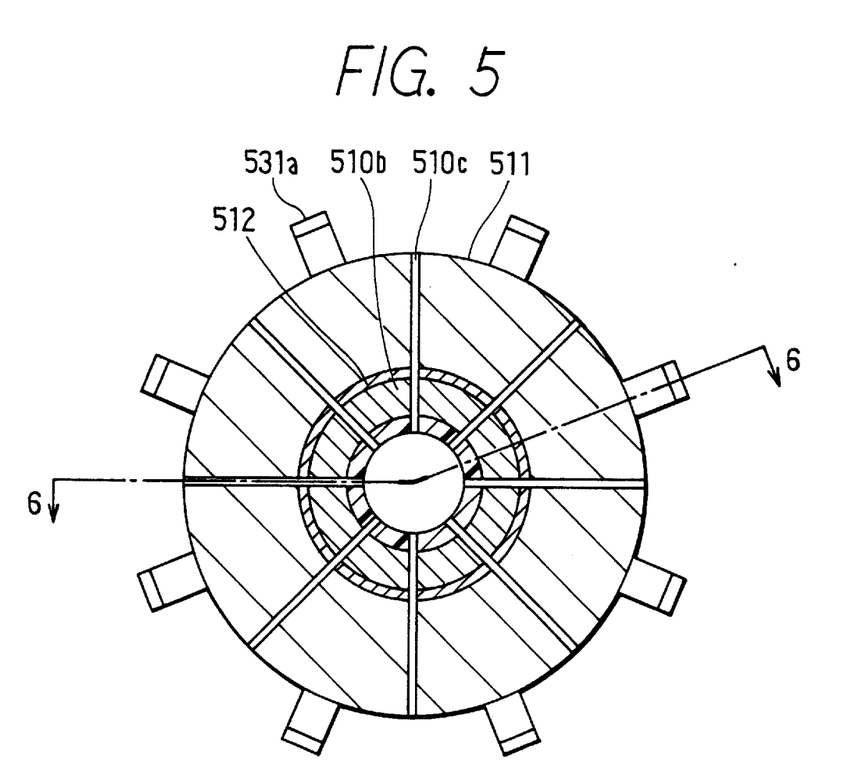
FIG. 5 is a cross-sectional plan view illustrating a variation of the commutator according to the first embodiment of the invention.
Figure 6:
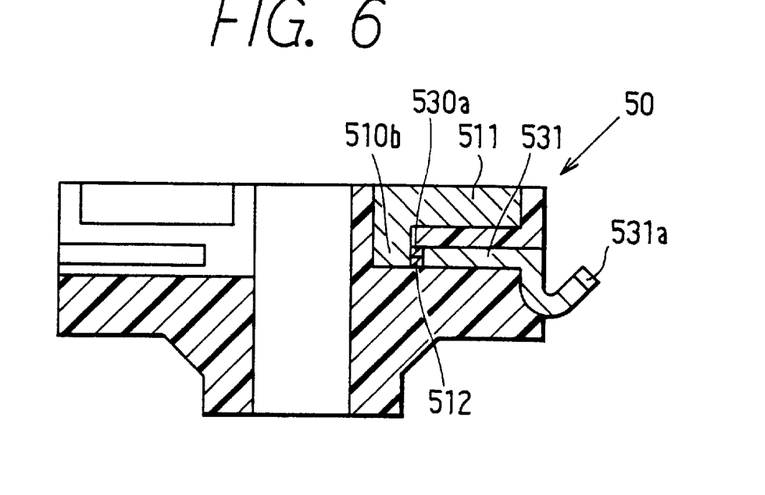
FIG. 6 is a cross-sectional side view of the commutator cut along line 6—6 in FIG. 5.

As another variation of commutator 50 according to the first embodiment, terminal unit 530 has center opening 530a instead of rectangular through holes 531b as shown in FIGS. 5 and 6. The diameter of center opening 530a is larger than the outside diameter of eight arc-shaped projections to accommodate connection members 512 therebetween. It is not necessary to dispose contact unit 510 apart from terminal unit 530 because connection members 512 are disposed remote from hooks 531a.

(Second Embodiment)

Figure 7:
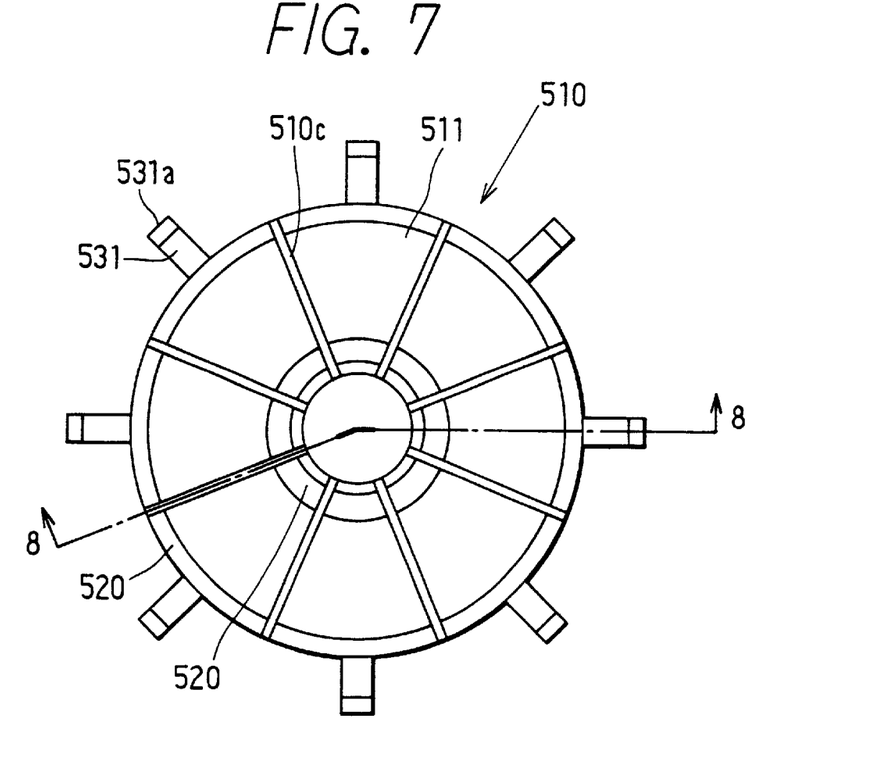
FIG. 7 is a cross-sectional plan view of the commutator according to a second embodiment of the invention.
Figure 8:
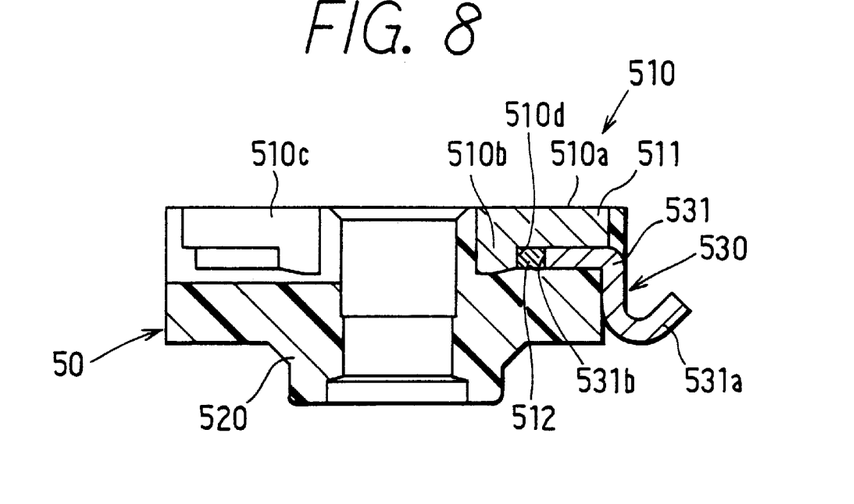
FIG. 8 is a cross-sectional side view illustrating the commutator cut along line 8—8 in FIG. 7.
Figure 9:
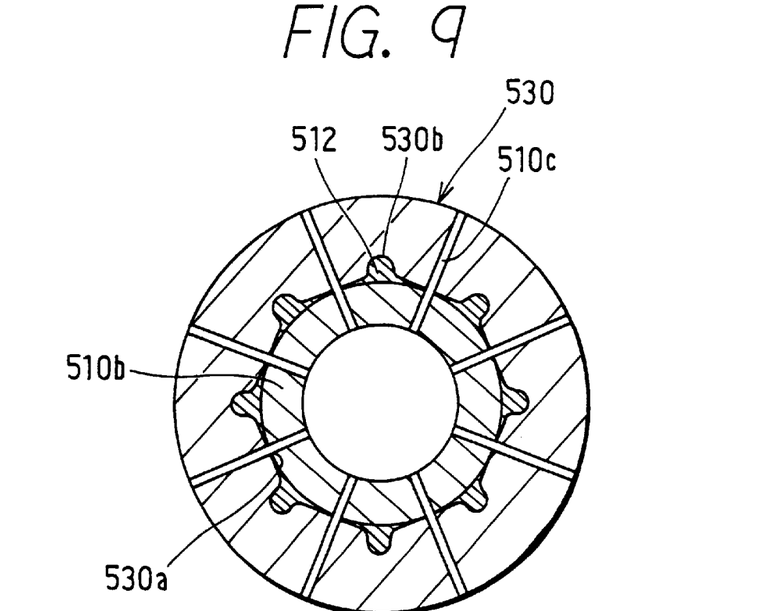
FIG. 9 is a cross-sectional side view illustrating a commutator according to a second embodiment of the invention.

Commutator 50 according to a second embodiment is described with reference to FIGS. 7–9.

Commutator 50 is composed of contact unit 510, base member 520, and terminal unit 530. Contact unit 510 has flat brush-contact surface 510a on one end thereof and axially extending cylindrical projection 510b on the other end. Contact unit 510 is composed of eight carbon segments 511 supported by resinous base member 520. Carbon segments 511 are spaced apart from one another by insulation grooves 510c. Terminal unit 530 is composed of eight brass-made terminal members 531 supported by base member 520. Terminal members 531 are also spaced apart from one another by insulation grooves 510c. Thus, each one of segments 511 is aligned with one of terminal members 531 between two grooves 510c. Each of terminal members 531 has hook 531a and contact surface 531b in contact with contact member 512. A lead extending from the armature winding is clamped by one of hooks 531a and connected thereto by fusing or the like. As shown in FIG. 9, terminal unit 530 has a generally octagonal center opening 530a which is inscribed by the outer periphery 510d of cylindrical projection. Eight semi-cylindrical concavities 530b are formed at respective corners or apex portions of octagonal opening 530a, thereby forming connection spaces between outer periphery 510d and the inner periphery of center opening 530a. Connection members 512, made of solder, are filled in the connection spaces respectively to electrically connect each of segments to corresponding one of terminal members.

Commutator 50 is manufactured as follows.

(1) A solid carbon disk having an axially extending solid cylindrical projection that corresponds to cylindrical projection 510b is formed.

(2) A brass ring member is formed to have regular octagonal center opening that corresponds to center opening 530a. The center opening is formed to be inscribed by the outer periphery of the cylindrical projection so that the cylindrical projection can be held in a right position. That is, the connection spaces are formed around the cylindrical projection evenly.

(3) Solid solders are inserted in the connection spaces respectively and heated to melt therein, so that the melted solder flows from the connection spaces into small gaps between the cylindrical projection and the ring member, thus forming connection members 512 connecting the cylindrical projection and the ring member.

(4) Resinous insulation material is molded with the carbon disk and the ring member to form an uncut commutator. Thereafter, eight longitudinal grooves 510c are formed to divide the carbon disk and the ring into eight segments 511 and eight terminal members 531. Thus, commutator 50 is provided.

When leads of an armature winding are connected to hooks 531a by fusing, fusing heat is conducted to connection member 512 from hooks 531a. However, the heat is dissipated due to a comparatively long conduction passage so that connection member 512 can be kept solid, thereby ensuring electric connection.

Figure 10:
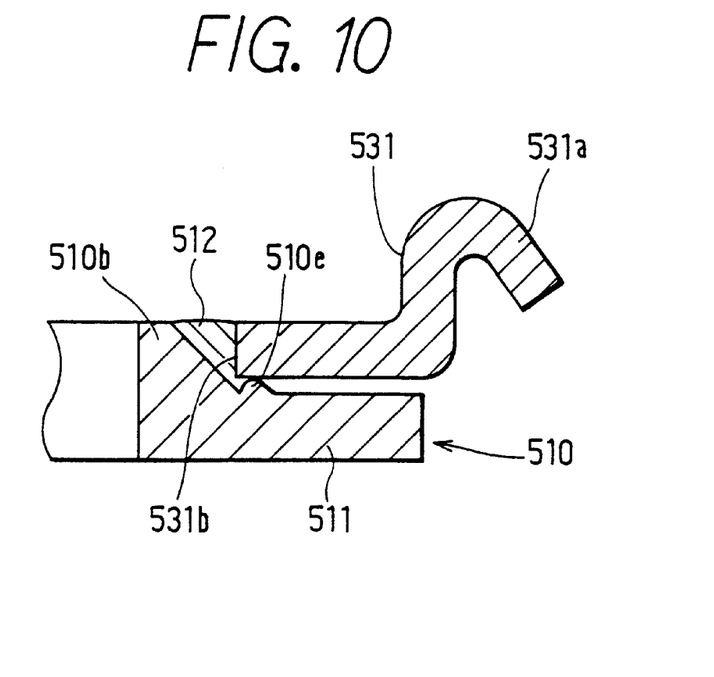
FIG. 10 is a fragmentary cross-sectional side view of a main portion of a variation of the commutator according to the second embodiment.

A variation of the second embodiment is shown upside down in FIG. 10. Cylindrical projection 510b has tapered or chamfered surface and an annular rise 510e. The tapered surface provides a wide open gate for melted solder and annular rise 510e dams the melted solder.

(Third Embodiment)

Figure 11:
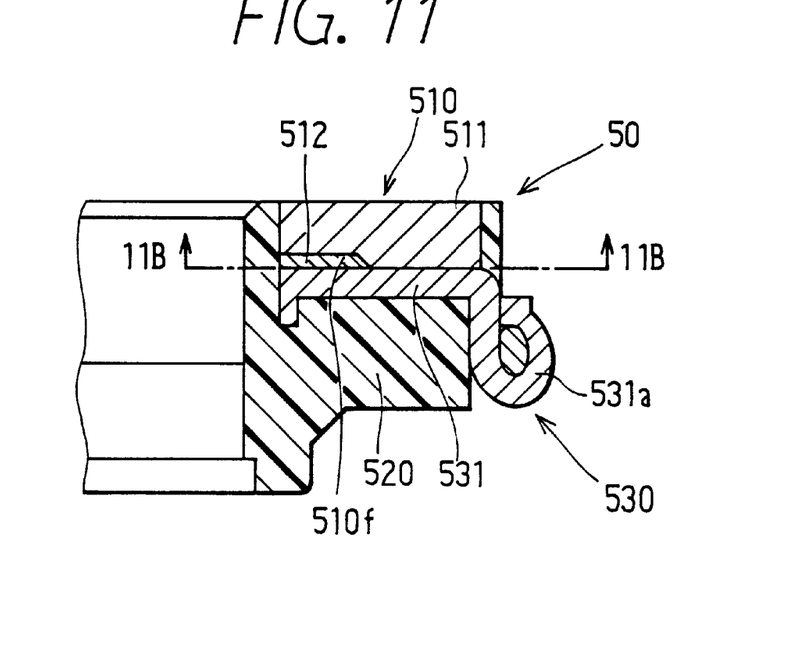
FIG. 11 is a fragmentary cross-sectional side view of a main portion of a commutator according to a third embodiment of the present invention.

Commutator 50 according to a third embodiment of the invention is described with reference to FIG. 11.

Contact unit 510 has annular groove 510f on the surface facing terminal unit 530 to accommodate connection members 512. The surface of annular groove 510f is plated with conductive metal, and the surface of terminal unit to be connected that faces annular groove 510f is applied with flux to improve the wettability of solder. Other surfaces that are not to be connected may be coated with polytetrafluoroethylene or the like.

Figure 12:
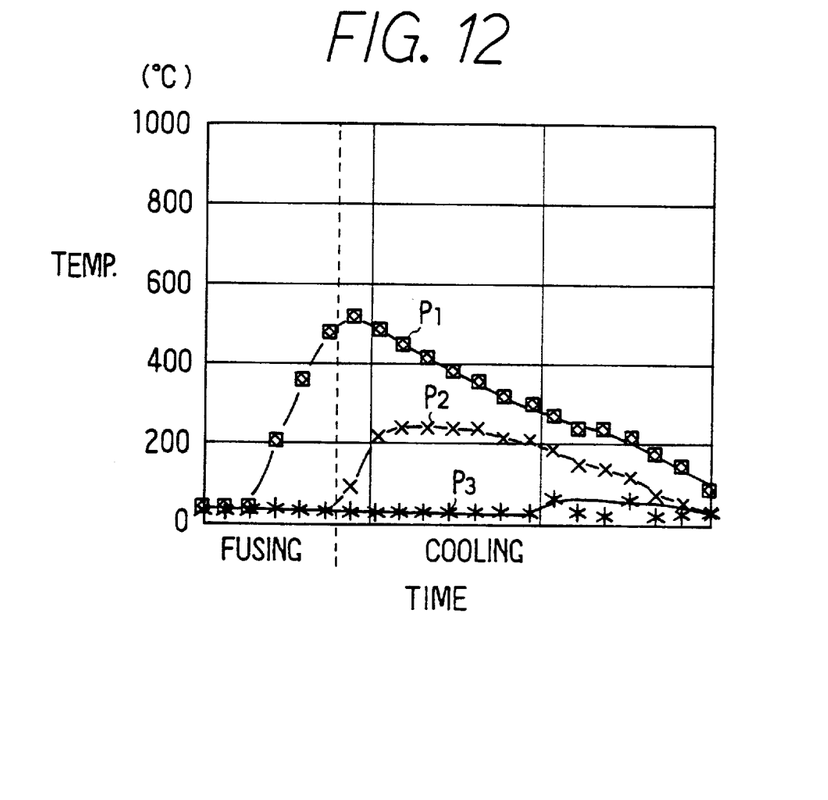
FIG. 12 is a graph showing temperature change of various portions of a terminal member with respect with time.
Figure 13:
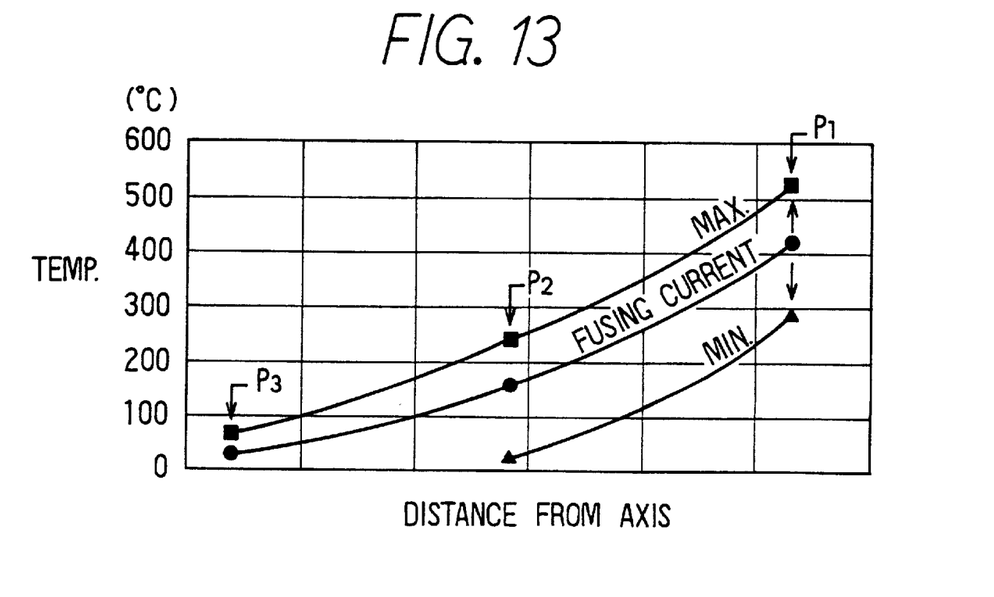
FIG. 13 is a graph showing relationship between distance from rotation axis and temperature of various portions of a terminal member.

FIG. 12 is a test result showing relationship between temperature of three different points, P1, P2, P3, of terminal member 531 and time in which fusing is started, finished and a test sample is cooled under room temperature. Point P1 is located at a portion of terminal member 531 adjacent to hook 531a, point P2 is located at the middle of the same, and point P3 is located at a portion thereof adjacent to connection member 512. Although temperature at point P3 rises after the fusing is finished, the temperature thereof is lower than 200° C. and the melting temperature 232° C. of tin even if the fusing current fluctuates to a maximum value thereof.

Figure 14:
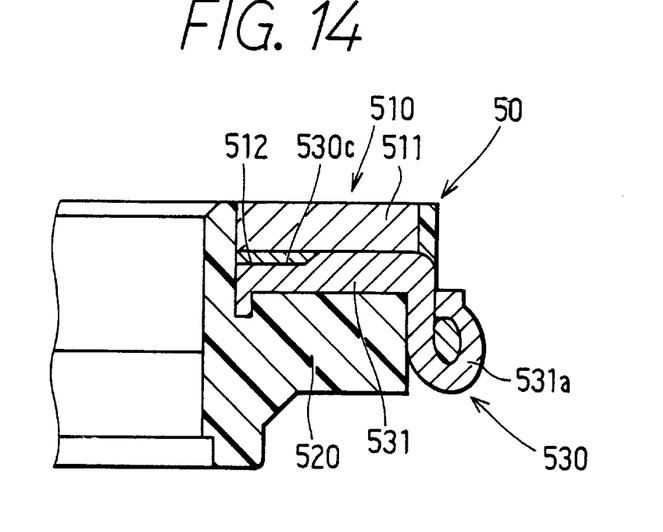
FIG. 14 is a fragmentary cross-sectional side view illustrating a main portion of a variation of the commutator according to the third embodiment.

Annular groove 530c that is formed on terminal unit 530 as shown in FIG. 14 can be substituted for annular groove 510f that is formed on contact unit 510.

Figure 15:
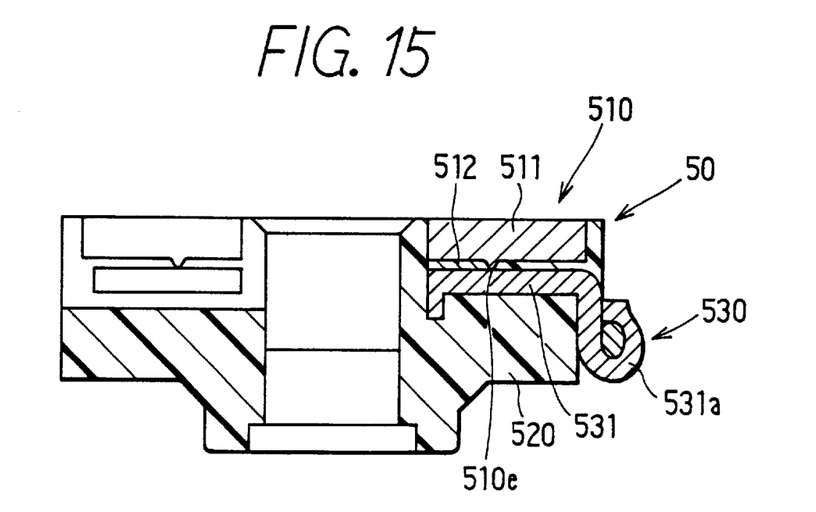
FIG. 15 is a cross-sectional side view illustrating a variation of the commutator according to the third embodiment.

Annular rise 510e can be formed on the surface of contact unit 510 facing terminal unit 530 as shown in FIG. 15, so that connection members 512 can be held in spaces between contact unit 510 and terminal unit 530 inside annular rise 510e. When connection members 512 are formed from melted solder material, annular rise 510e is effective to hold the melted solder in the spaces.

Figure 16A:
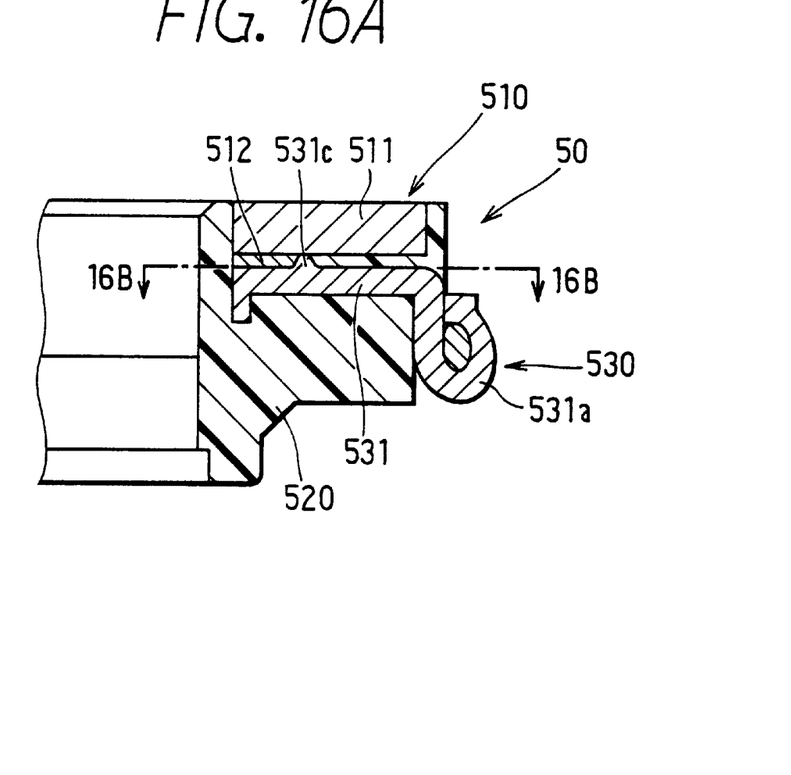
FIG. 16A is a cross-sectional side view illustrating a variation of the commutator according to the third embodiment.
Figure 16B:
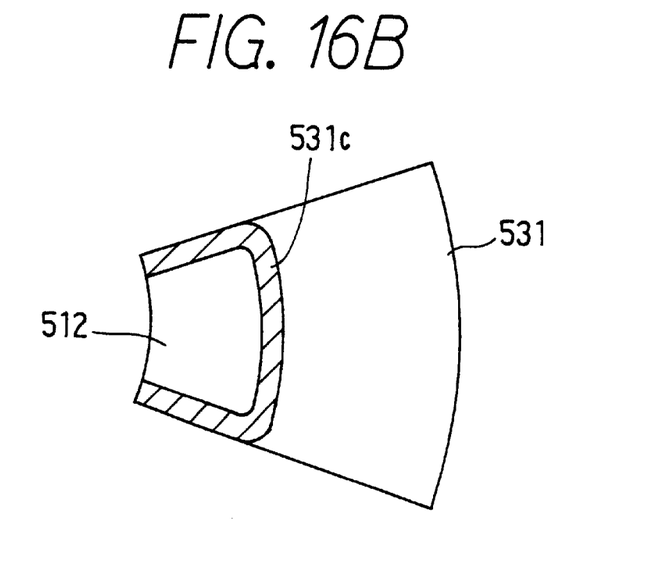
FIG. 16B is a portion of the commutator illustrated in FIG. 16A cut along line 16B—16B.

Instead of annular rise 531c described above, C-shaped rise 531c can be formed on each of terminal members 531 as shown in FIGS. 16A and 16B. Accordingly, C-shaped rises 531c are effective to hold the melted solder when connection members 512 are formed. Rises corresponding to C-shaped rises 531c can be formed on respective segments 511 of contact unit 530.

Figure 17A:
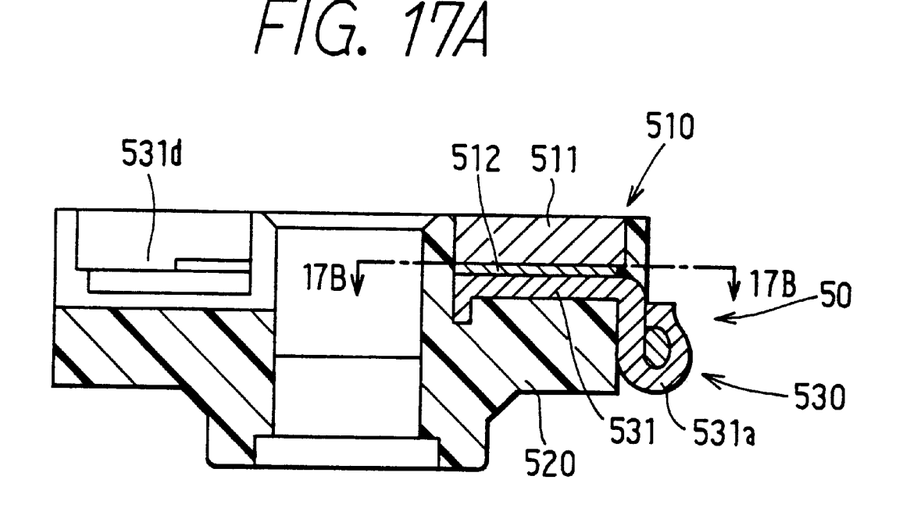
FIG. 17A is a cross-sectional side view illustrating a variation of the commutator according to the third embodiment.
Figure 17B:
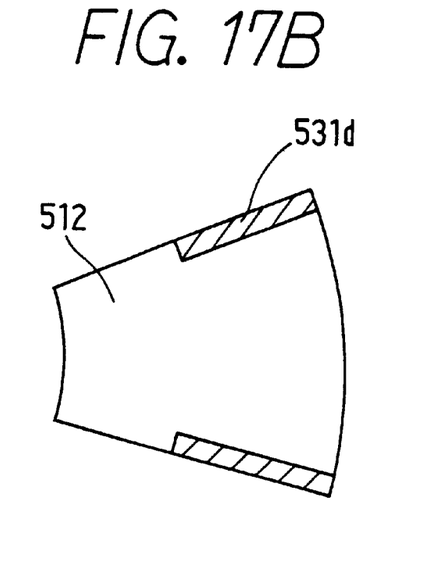
FIG. 17B is a portion of the commutator illustrated in FIG. 17A cut along line 17B—17B.

A pair of radial rises 531d can be formed on opposite sides of each of terminal members 531 as shown in FIGS. 17A, and 17B. The pair of rises are effective to prevent the melted solder from flowing out. That is, connection members 512 can be prevented from short-circuiting segments 511 even if a portion thereof is melted. A pair of radial rises can be formed on segments 511 instead of terminal members 531.

Figure 18:
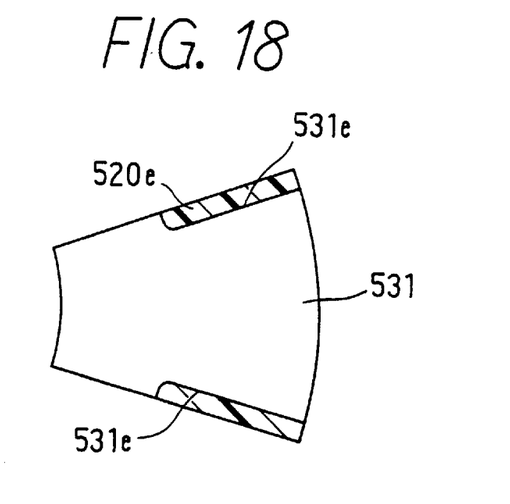
FIG. 18 is a schematic cross-sectional view illustrating a portion of a variation of the commutator according to the third embodiment.

A pair of rises 520e can be formed on base member 520 to be fitted to a pair of concavities formed along opposite sides of each of terminal members 531 as shown in FIG. 18. The pair of rises 520e are also effective to prevent the melted solder from flowing out.

(Fourth Embodiment)

Figure 19:
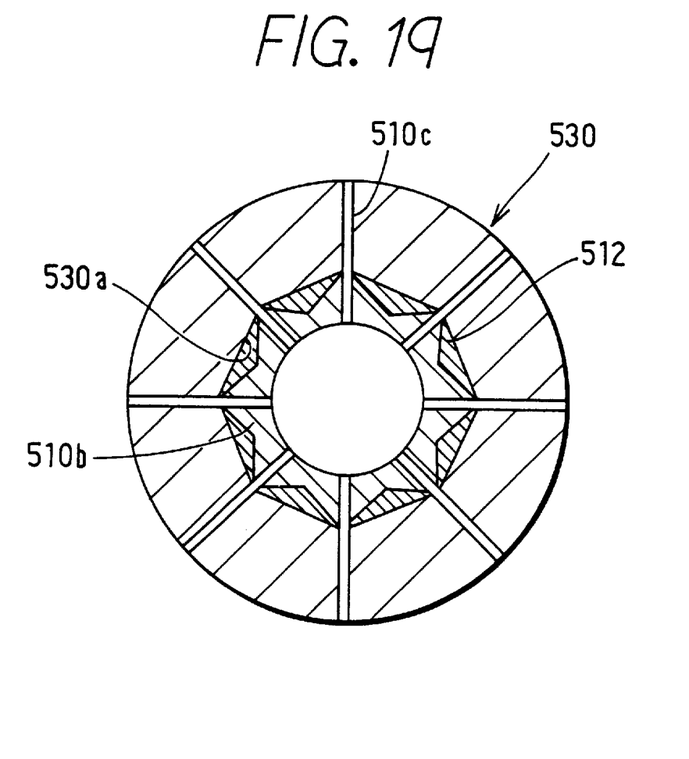
FIG. 19 is a cross-sectional plan view of a commutator according to a fourth embodiment the invention.

A commutator according to a fourth embodiment is shown in FIG. 19

Contact unit 510 has star-shaped projection 510b having eight salient corners. Terminal unit 530 has an octagonal center opening 530a that is inscribed by the eight salient corners. Connection members 512 are disposed in the spaces between the inner periphery of center opening 530a and outer periphery of star-shaped projection 510b.

Figure 20:
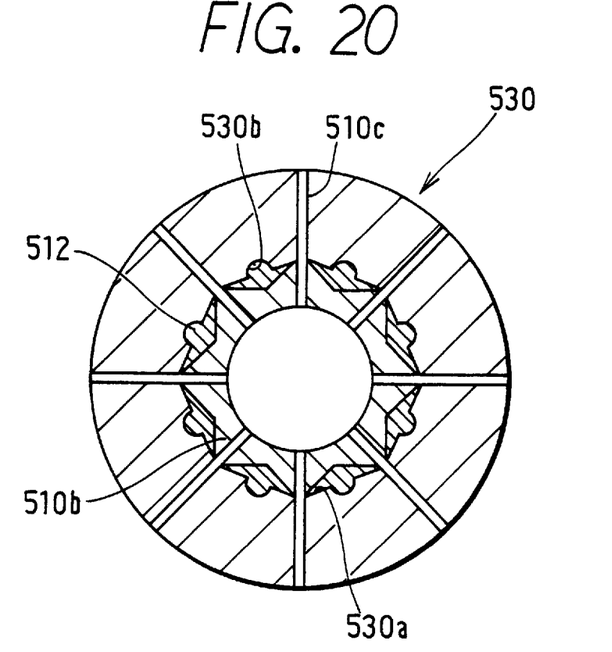
FIG. 20 is a cross-sectional plan view of a variation of the commutator according to the fourth embodiment.

Concavities 530b can be formed to increase volume of connection members 512 on portions of the inner periphery of center opening 530a between the salient corners as shown in FIG. 20.

(Fifth Embodiment)

Figure 21:
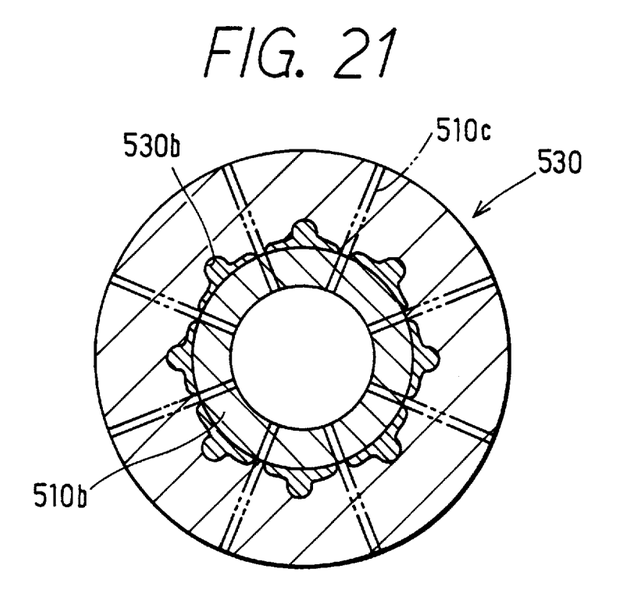
FIG. 21 is a cross-sectional plan view of a commutator according to a fifth embodiment of the invention.

Commutator 50 according to a fifth embodiment of the present invention is shown in FIG. 21.

This commutator is made of an uncut center opening that has eight projections in contact with the outer periphery of an uncut cylindrical projection between eight cavities 530b.

Therefore, the volume of connection members 512 can be increased to ensure stable connection even if sizes of the components vary.

Figure 22:
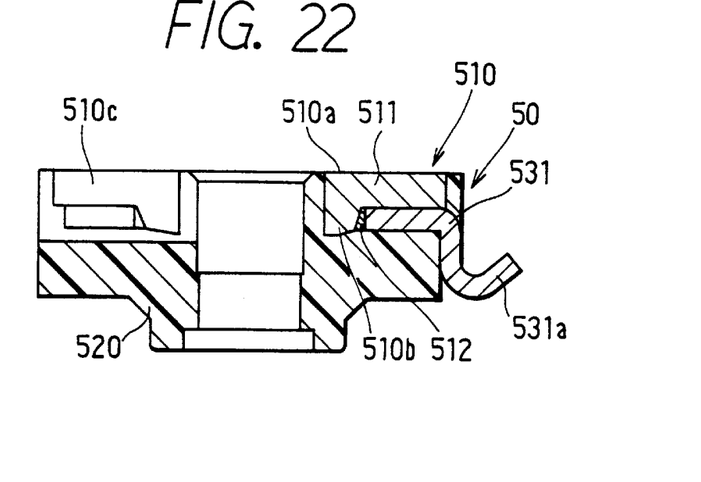
FIG. 22 is a cross-sectional side view illustrating a variation of a commutator according to the fifth embodiment.
Figure 23:
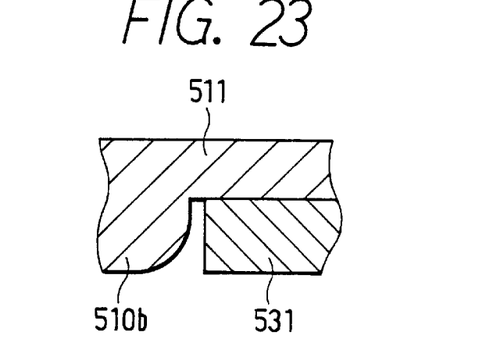
FIG. 23 is an enlarged fragmentary cross-sectional view of a variation of the commutator according to the fifth embodiment.

Cylindrical projection 510b can have tapered or chamfered surfaces as shown in FIGS. 22 and 23. When the commutator is assembled and heated, the portions of the solder in contact with the cylindrical projection is melted earlier than the portions of the solder in contact with the ring member because the tapered surface of carbon cylindrical projection 510 is wider than the surface of terminal member 531 in contact with connection members 512. The melted solder flows to the ring member corresponding to terminal members 531, thereby dampening to solder the same. Thus, cylindrical carbon projection 510 and the brass ring member can be soldered with certainly.

Figure 24:
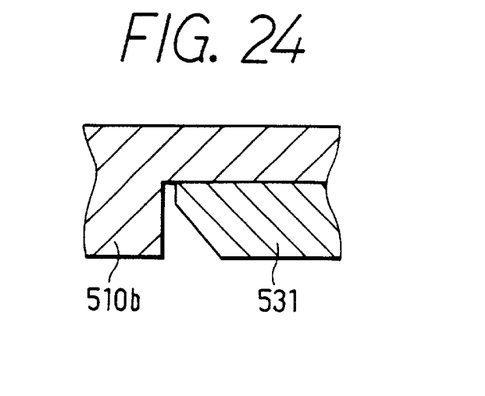
FIG. 24 is an enlarged fragmentary cross-sectional view of a variation of the commutator according to the fifth embodiment.

Terminal member 531 can have an inclined surface as shown in FIG. 24 instead of the tapered surface of cylindrical projection 510. Therefore, the volume of connection members 530b can be increased to ensure stable connection even if sizes of the components vary.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A commutator including a contact unit having a flat brush-contact surface and a connection surface opposite said brush contact surface, a base member made of insulation material and a terminal unit, said contact unit having a plurality of commutator segments, said terminal unit having a plurality of conductive terminal members, and said base member supporting said commutator segments, said commutator comprising:

an electrical connection structure having a set of a convex member and a concave member and a plurality of connection members disposed between said convex member and concave member for connecting said plurality of commutator segments and said terminal members respectively;

wherein said convex member comprises a plurality of projections axially extending from said contact unit, and said concave member comprises a portion of said terminal unit engaged with said projections; and said concave member being formed by through holes in said terminal unit that receive respective projections to engage said projections with said terminal unit.

2. The commutator as claimed in claim 1, wherein said plurality of projections has a generally cylindrical outer periphery, said terminal unit has a generally regular polygonal surface inscribed by said cylindrical outer periphery and apex portions, each of said connection members is disposed in a connection space defined by one of said apex portions, said polygonal surface, said cylindrical outer periphery between one of said segments and corresponding one of said terminal members.

3. The commutator as claimed in claim 2, wherein each of said apex portions has a concavity having an open end gradually merging with said polygonal surface.

4. The commutator as claimed in claim 2, wherein said cylindrical outer periphery has a chamfered portion thereby forming said connection space into an axially expanding shape.

5. A commutator including a contact unit having a flat brush-contact surface and a connection surface opposite said brush-contact surface, a base member made of insulation material and a terminal unit, said contact unit having a plurality of commutator segments, said terminal unit having a plurality of conductive terminal members, and said base member supporting said commutator segments, said commutator comprising:

an electrical connection structure having a set of a convex member and a concave member and a plurality of connection members disposed between said convex member and concave member for connecting said plurality of commutator segments and said terminal members respectively;

wherein said convex member comprises a plurality of projections axially extending from said contact unit, and said concave member comprises a portion of said terminal unit engaged with said projections; and said contact unit and said terminal unit are spaced apart from each other by said base member except said connection structure.

6. The commutator as claimed in claim 5 further comprising an insulation spacer disposed between said contact unit and said terminal unit.

7. A commutator including a contact unit having a flat brush-contact surface and a connection surface opposite said brush contact surface, a base member made of insulation material and a terminal unit, said contact unit having a plurality of commutator segments, said terminal unit having a plurality of conductive terminal members, and said base member supporting said commutator segments, said commutator comprising:

an electrical connection structure having a set of a convex member and a concave member and a plurality of connection members disposed between said convex member and concave member for connecting said plurality of commutator segments and said terminal members respectively wherein said electrical connection structure comprises a rise member disposed between said contact unit and said terminal unit for holding said connection member when said connection member are melted.

8. The commutator as claimed in claim 7, wherein said rise member comprises a plurality of members extending from said base member to surround opposite circumferential sides of each of said terminal members.

9. A carbon commutator comprising:

a carbon disk having a flat brush-contact surface and a plurality of commutator segments;

a support member made of insulation material, said support member for supporting said commutator segments;

a metallic terminal made of brass and formed in a disk shape, said metallic terminal having a hook at a peripheral portion for fixing a coil by fusing, said metallic terminal having a bonding portion for bonding with said carbon disk; and a bond disposed between said carbon disk and said bonding portion of said metallic terminal, said bond maintaining bonding between said carbon disk and said metallic member during application of fusing heat, said fusing heat for fusing said hook to said coil.

10. A carbon commutator according to claim 9, wherein said bond is positioned radially between said carbon disk and said bonding portion to bond with said metallic terminal.

11. A carbon commutator comprising:

a carbon disk having a flat brush-contact surface and a plurality of commutator segments;

a support member made of insulation material, said support member supporting said commutator segments; and a metallic terminal made of brass, said metallic terminal having a hook extending from a radially peripheral area of said support member, said metallic terminal for affixing a coil by fusing said metallic terminal having a disk-shaped bonding portion, said bonding portion adjacent said carbon disk at least at a radially inward side of said carbon disk and a radially outward side of said carbon disk, said bonding portion stacked with said carbon disk and said support member along an axial direction, said support member adjacent said bonding portion on an upper face and a lower face;

wherein said disk-shaped bonding portion includes a bond disposed between said carbon disk and said bonding portion, said bond disposed on said radially inward side of said carbon disk between said carbon disk and said bonding portion, said bond bonding said carbon disk to said metallic terminal during fusing heating; and wherein said upper face of said support member and said bonding portion are in an unbonded state, said radially outward side of said carbon disk and said bonding portion being in an unbonded state.

* * * * *